United States Patent Office 3,342,935
Patented Sept. 19, 1967

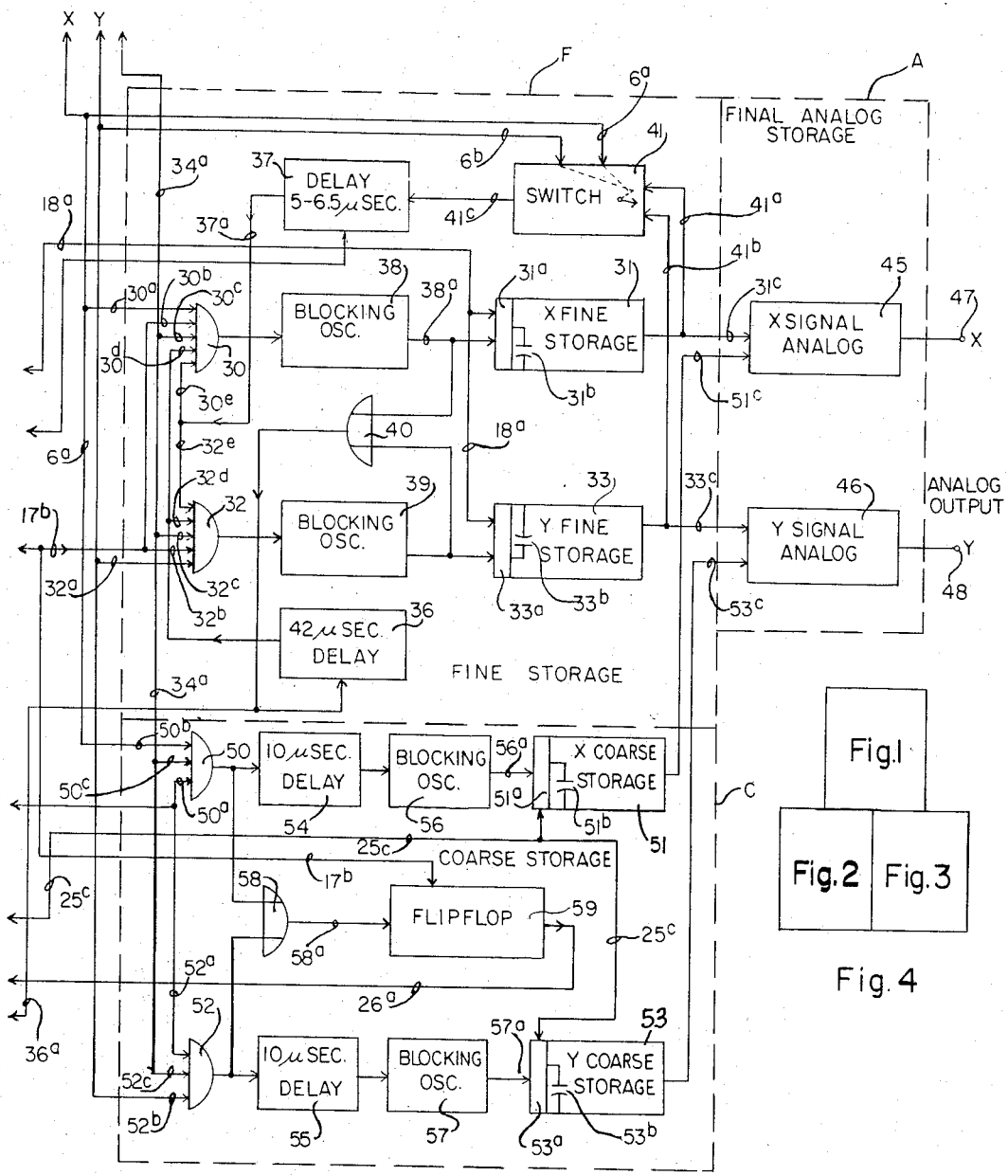

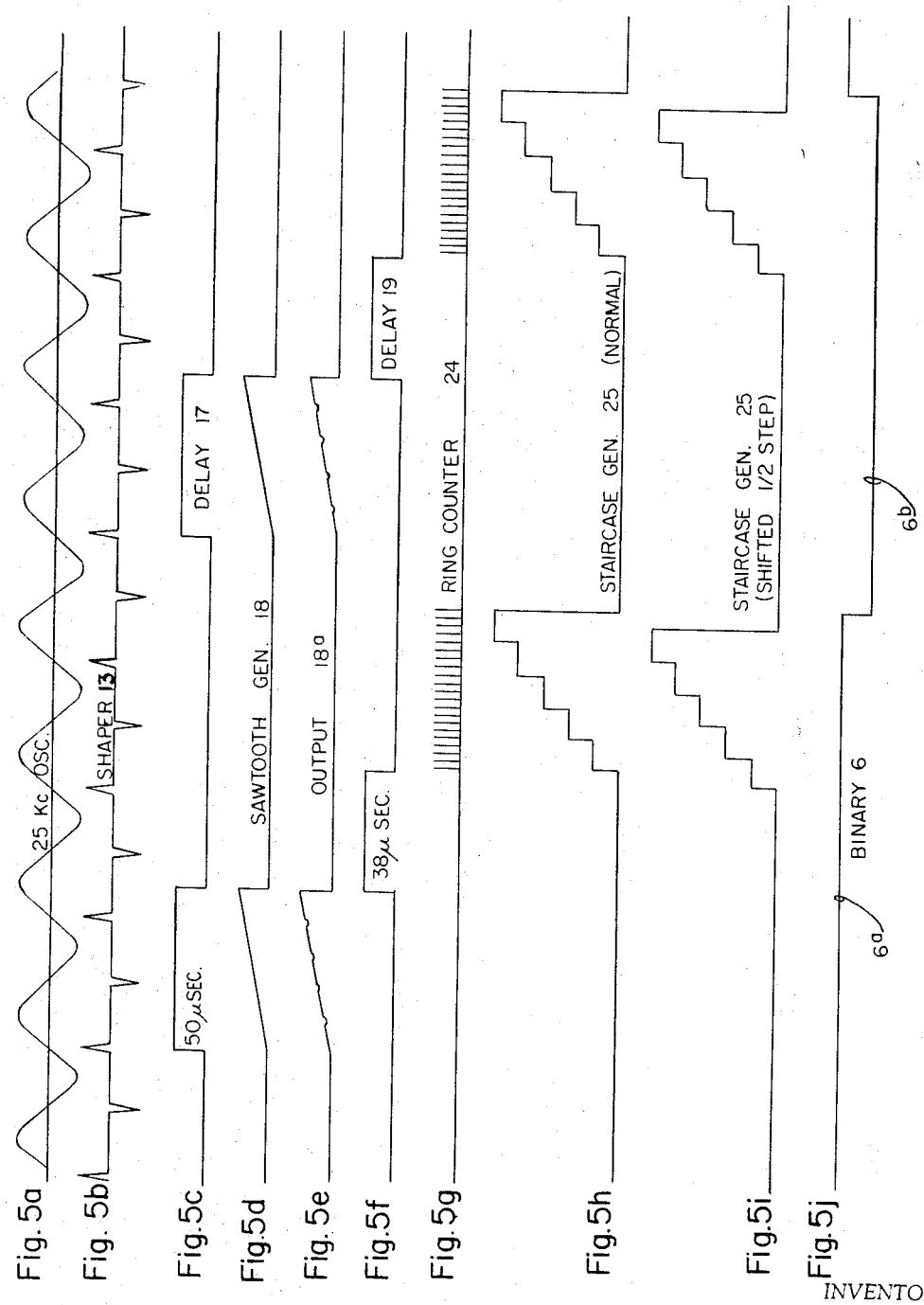

3,342,935
FREE STYLUS POSITION LOCATING SYSTEM
Joseph Charles Leifer, Forest Heights, Md., and Louis Mittelman, Jr., Alexandria, and Erwin Julius Sobol, Falls Church, Va., assignors to American Machine & Foundry Company, a corporation of New Jersey
Filed Jan. 20, 1964, Ser. No. 338,883
18 Claims. (Cl. 178—19)

ABSTRACT OF THE DISCLOSURE

An electronic system is described for locating the position of a probe or stylus with respect to a matrix of coordinate conductors. The system includes generating means for applying voltages to the conductors, first along one coordinate and then along the other, in rapidly alternating sequence. Coarse and fine position sensing are employed, and the system provides for analog readout of stylus position.

Figure 1:
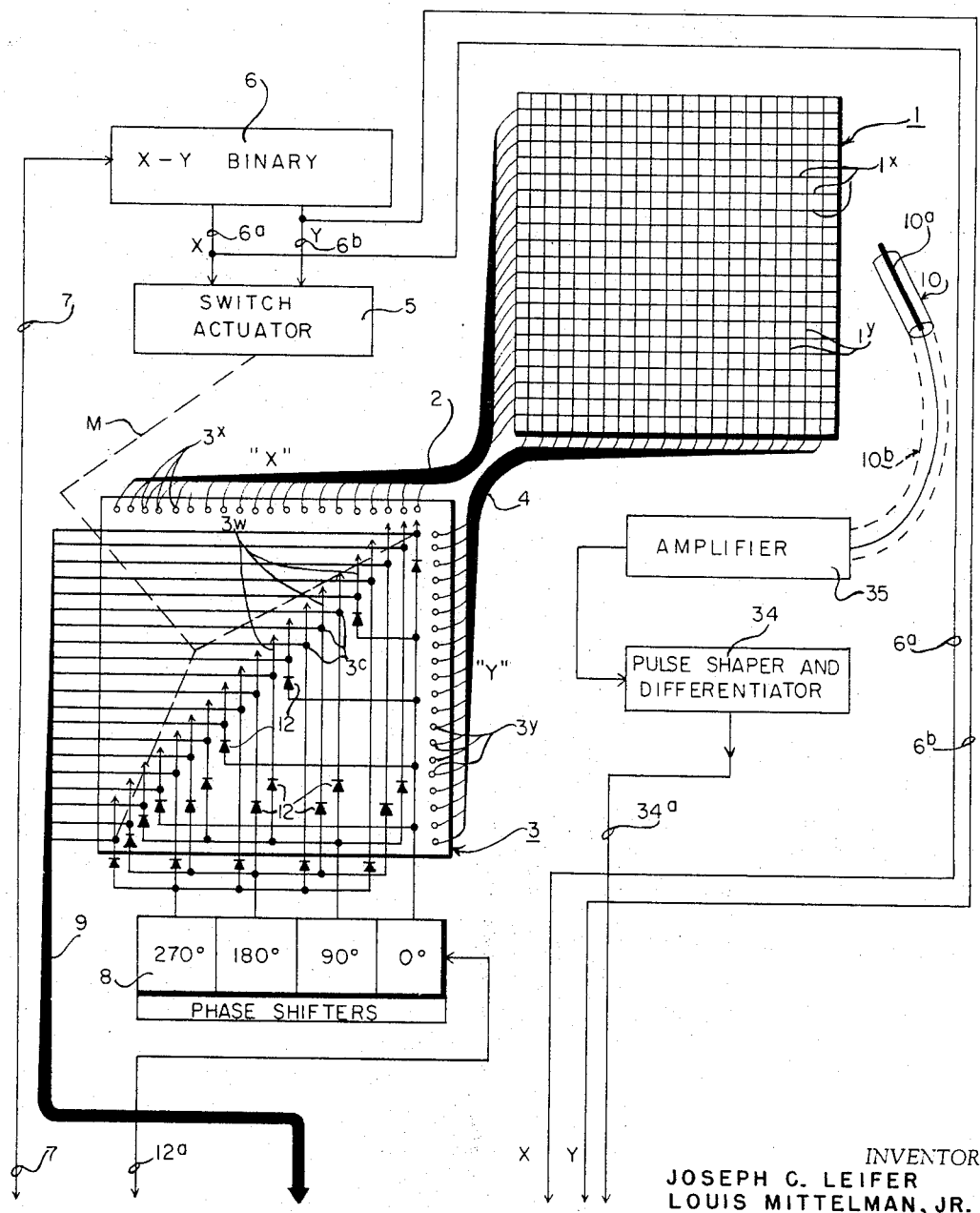

This invention relates to a novel system for locating the position of a stylus or probe which can be manually or otherwise freely moved about with respect to a matrix of coordinate conductors, the system continuously defining the relative position of the stylus with respect to each separate family of conductors in terms of the magnitudes of separate electrical outputs, one for each different coordinate.

An object of this invention is to provide a free-stylus positioning system which can be used to trace a graphical representation, and/or to create a new graphic representation, for instance by translating the handwriting of an opertaor holding the stylus into machine-language coordinate voltages which can be used to reproduce the representation at a remote location or time.

In an existing practical working embodiment of the present system, the stylus has a capacitive pick-up tip which can be traced across a matrix conductor board comprising a transparent sheet such as plastic or glass with families of mutually-spaced conductors forming a rectangular grid in which the conductors of one coordinate family cross but do not touch the conductors of the other coordinate. For purposes of description the transparent sheet will be hereinafter referred to as a suitable plastic material. The conductors representing each coordinate comprise wires which are mutually spaced apart by 0.3 inch. This matrix is alternately energized along the $x$ coordinate, and then along the $y$ coordinate, and during measurements of the stylus position with respect to each coordinate two functions are performed: namely, a coarse measurement of the stylus position, and a fine measurement of the stylus position. These measurements can be performed successively in either order. The working model is wired in such a way that the fine measurement is performed first, and then the coarse measurement follows. The coarse measurement of the position of the stylus is made by applying a series of discrete pulses applied sequentially to one wire at a time across the board. The coarse position of the stylus is then estimated by the first pulse which is picked up by the stylus from an adjacent wire. The fine information as to the position of the stylus is determined by exciting the wires in groups of four wires each with the same sine wave signals applied to each of the four wires but respectively in quadrature relationship, 0°, 90°, 180°, and 270°. The actual position of the stylus is determined by picking up a mixture of the phases from the nearest neighboring wires and delivering it through the stylus and into a system which interpolates between the received phases. These sine wave signals are simultaneously applied to all of the wires comprising a coordinate system, and the same phase repreats on every fifth wire.

In the practical working model, the matrix board comprises a 30 inch square panel of transparent material such as plastic or glass which is light weight and highly portable so that it can be moved into any position, for instance, for the purpose of laying it over a map or other graphical representation, or over a tracing table, etc. The matrix panel can be oriented into any position, and is connected to separately packaged electronic circuitry by a light-weight cable of small conductors attached to one corner of the panel. Although the present example is presented in terms of orthogonal crossed-conductors, it is to be understood that any other system of coordinates can be used, such as polar, multipolar, or other coordinate systems which may in the simplest case comprise a single coordinate defining position along a line or contour, or which system in a more sophisticated case can have three or more dimensional coordinates. The matrix of wires is embedded in the plastic panel to insure its dimensionally stable mutual relationship. The panel may be made of flexible material so that it can be bent to follow a non-planar contour.

The stylus in the present working example comprises an instrument shaped like a pencil and having a pickup tip pointed in such a way that only the position of the point will be defined by the system, and so that the defined position will not be affected by changes in attitude of the stylus, at least within a normal range of handwriting positions, for example 45°–90°. Moreover, since the pickup is capacitive, rotation of the stylus will not affect its apparent position. The information picked up by the tip of the stylus may be transmitted to the separately-packaged electronics either by a thin shielded cable, or else by modulating a small oscillator contained in the handle of the stylus. It is also desirable that the stylus be able to draw lines on the surface which it traces, or for instance on a sheet of velum paper located between the tip of the stylus and the matrix board. For this reason, the capacitive pickup used in the practical working model comprises a writing instrument in the form of a ballpoint pen refill cartridge. The point of the stylus need not be held right on the matrix panel as evidenced by the fact that the present working system is able to operate satisfactorily while writing on a pad of paper ⅛ inch thick interposed between the tip of the stylus and the matrix panel. Actually, beyond ⅛ inch thickness, errors begin to become noticeable, but on the other hand the interposing of only a few sheets of paper between the stylus tip and the matrix panel does not appear to affect the accuracy of the system.

Aside from the objects and advantages set forth in the above description of the practical working structure, the system of the present invention also includes the following additional objects.

It is an object of this invention to provide a system capable of defining the position of the stylus with respect to a family of conductors with a high degree of accuracy, plus or minus 0.1% in the 30 x 30 inch panel described above, and further to provide such a system capable of high accuracy employing a substantially free stylus which requires no mechanical linkages for connecting it with the conductor matrix, such as lead screws, hand wheels, joy sticks, or pantograph means.

Another object of this invention is to provide a system capable of accurately locating the stylus position without requiring generation of a complex system of non-functional data.

It is a further object of this invention to provide a system which can accurately define the position of the stylus with respect to a matrix of coordinate conductors for 1, 2, 3, or more coordinates by providing a system which delivers at its output one voltage corresponding with each coordinate, which voltages by their magnitudes define the location of the stylus along those coordinates. This type of output has the particular advantage that it can be easily stored in a capacitor, recorded by magnetic or punched paper tape recording equipment, or can be directly displayed on an oscilloscope, on a mechanical oscillograph, or utilized by any servo-mechanism capable of accepting data in machine-language.

It is another object of this invention to provide a system in which the positional information is sampled at rather a high rate, for instance at a supersonic rate so that the system will be responsive to rapid movement of the tip of the stylus on the matrix. The present system permits movement of the stylus at velocities of 10 inch per second, and accelerations of 20 inch per second per second, while maintaining the system free of lag, overrun or jitter.

Yet another object of the present invention is to employ signals for exciting the matrix conductors at frequencies within a range which is not readily subject to external interference caused for example, by 60 cycle pick-up such as from fluorescent lamps, or by radio frequency interference of various types. The frequencies employed within the practical embodiment were within the rang of 25–400 kc., although the bandwidth of the stylus pick-up amplifier at the upper end of its frequency range was expanded to include the rise-time of the pulses identifying the various matrix conductors during coarse measurements.

A further object of the invention is to provide compensating circuitry for minimizing distortions which may occur due to the fact that in some positions of the stylus, its point is located very close to a matrix conductor, whereas in other positions of the stylus, the point is spaced from any of the coductors, i.e., part-way in between.

Figure 2:
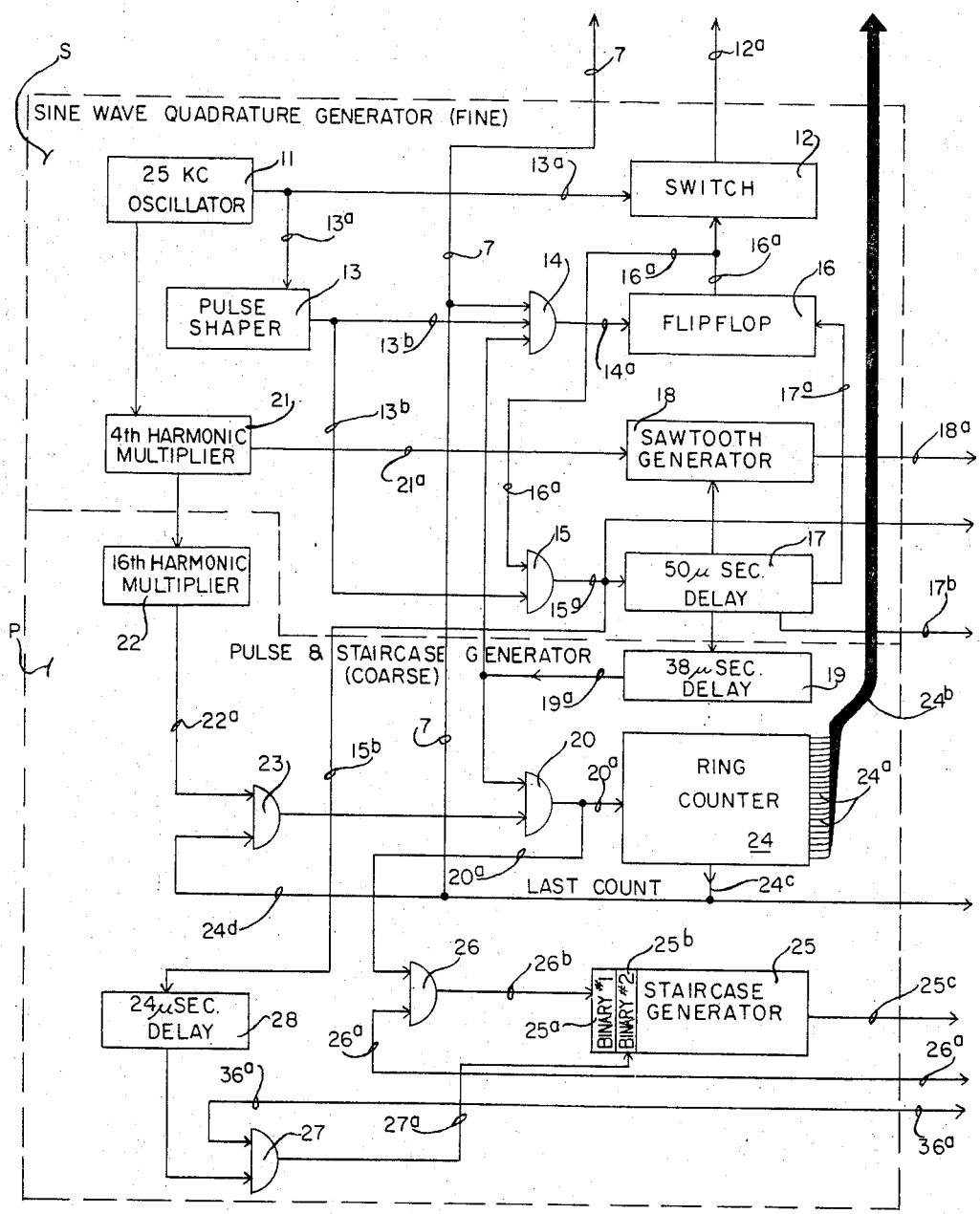

Other objects and advantages of the invention will become apparent during the following discussion of the drawings, wherein:

FIGS. 1, 2, and 3, when associated, comprise a composite block diagram showing a workable embodiment of the present invention.

FIG. 4 is a diagram illustrating the relative positions in which FIGS. 1, 2, and 3 should be associated in order to provide the composite diagram; and FIGS. 5 through 5j are columnized graphical illustrations of some of the waveforms encountered in the present system plotted against a horizontal time axis.

GENERAL DESCRIPTION

As set forth in the objects of this invention, the present system includes a coordinate conductor panel board including a matrix of crossed conductors, and a free stylus or probe shaped very much like a pencil which can be either manually or mechanically positioned with respect to the coordinates. These two mechanical devices are connected by wires to an electronic system including generator means for applying voltages to the matrix conductors, energizing first one set of coordinate conductors, and then the other set of coordinate conductors in rapidly alternating sequence. The probe has a tip which capacitively picks up the voltages applied to the conductors, which voltages uniquely define the position of the tip on the matrix board. These output analog voltages, when connected with the input terminals of an ordinary cathode ray oscilloscope can position the beam spot in the same relative position with respect to the screen of the oscilloscope as the position of the stylus tip on the surface of the matrix board.

Referring now to the drawings, and particularly to FIG. 1, the matrix board 1 includes families of crossed conductors $1x$ and $1y$ which in the present illustrative example form a system of ordinary rectangular coordinates. It is to be understood, as previously stated, that any other coordinate system can be employed. In the present example, the $x$ conductors are all connected by a cable 2 to the output terminals $3x$ of a coordinate selector switch 3, which includes a single-pole-double-throw switch for each of the coordinate conductors in any coordinate family on the matrix board. Likewise, all of the $y$ conductors are connected to the output terminals $3y$ by a cable 4, and the connections between the various conductors and the various terminals of the switch 3 are such as to preserve in the switch 3 the same sequence as the conductors occupy on the matrix board. The switch 3 also includes at each pole a switch wiper $3w$, each connected to a common input terminal $3c$, and these terminals $3c$ are all sequentially connected with the outputs of various waveform and/or pulse generators which will be described in detail presently.

The positions of all of the wipers $3w$ are simultaneously operated by a suitable switch linkage M which is controlled by a suitable switch actuator 5 in response to a simple binary circuit 6, comprising for example a multivibrator which reverses between two stable states each time the binary 6 is pulsed by the wire 7. The function of the circuitry described so far is to alternately connect the input terminals $3c$ of the switch 3 with either the terminals $3x$ or the terminals $3y$, and to reverse these connections for each reversal of the binary 6.

Assuming that one of the coordinates, for instance the $x$ coordinate, is connected by the wipers $3w$ with the inputs applied to the common terminals $3c$, two different and separately generated input signals are successively applied to the $x$ coordinates. There is a coarse-position determining series of pulses generated in a pulse generator P, one pulse for each coordinate conductor on the matrix. These pulses are sequentially applied across the matrix, one conductor at a time, and the instant at which a pulse appears at any particular conductor defines in coarse terms the general position of the stylus with respect to that particular coordinate. All of these pulses are delivered in succession to the wipers $3w$ by way of the wires in a cable 9, one wire at a time being energized by a pulse. The external electronic circuitry includes means which determine which one of these time-separated pulses energized the stylus 10, meaning that the stylus tip was located nearest the conductor on which that particular pulse appeared. The probe is a capacitive pickup device which in the working embodiment uses a ballpoint pen refill $10a$.

The other signals applied to the same matrix conductors are fine-position-defining signals controlled by a sine wave oscillator 11, see FIG. 2. This system includes phase shifters 8 which take the sine wave generated by the oscillator 11, see FIG. 5a, and split it into quadrature signals. Thus the outputs of the phase shifters 8 comprise four sine wave signals respectively, 0°, 90°, 180°, and 270° apart. Each of these signals is applied to every fourth common terminal $3c$ of the switch 3, employing coupling diodes generally referred to by the reference numeral 12 so as to prevent feedback from any common terminal $3c$ to a different common terminal via the phase shifters 8. All of the $x$ conductors on the matrix board are simultaneously energized by these quadrature components. The position of the probe 10 is finely determined by external electronic circuitry connected to the probe by a cable $10b$, this circuitry to be explained hereinafter with respect to the several neighboring conductors bearing quadrature phase voltages which are analyzed to determine the fine position of the probe.

Thus, the coarse position of the probe 10 is determined with respect to the coordinate conductors $1x$ by determining which pulse or pulses applied thereto are picked up by the probe 10; and the fine position of the probe is determined by the sine wave quadrature signals from the sine wave generator S with respect to neighboring coordinate conductors bearing shifted components of this sine wave. When both the coarse and the fine information has been received during an overall cycle of the system, the switch 3 is actuated to shift the wipers 3w from the terminals 3x to the terminals 3y, and the same two steps are again carried out, this time determining in a similar way the position of the stylus 10 with respect to the conductors 1y of the matrix. It really does not matter whether a coarse or a fine reading is taken first, and in the working embodiment illustrated herein during each complete cycle of the system, a fine position of the stylus 10 is first determined by the quadrature sine wave means S which is then shut off, and the time-spaced pulses are then applied to the same coordinate conductors to determine the coarse position of the stylus 10. Thereafter the switch 3 is actuated so as to energize the other set of coordinate conductors to first determine the fine position of the probe, and then its coarse position. All of the signal information representing coarse and fine positions is separately stored in the circuitry shown in FIG. 3, and these bits of fine and coarse information are then combined in a manner to be hereinafter described to provide $x$ and $y$ analog signals representing the position of the stylus tip with respect to the conductors of these coordinates.

FINE POSITIONING SYSTEM

Because of the manner in which the sequence programming circuits are interconnected, it is convenient to begin describing the electronic circuitry by describing the sine wave generator system S shown in FIG. 2. The timing circuitry which controls the sequential cycle functions operates by having each function, upon completion, actuate the beginning of the next function of the sequence. Therefore, the sequential gating circuits will be described along with the components of the functions which they control.

The system derives its timing from the sine wave oscillator 11 which runs continuously and which generates, in the present illustrative example, a 25 kilocycle sine wave, FIG. 5a. This sine wave is periodically applied by way of an output line 12a of a switch 12 to the phase shifters 8 during the portion of the cycle in which the fine position of the probe is being determined. Approximately one cycle of the 25 kc. oscillation would be sufficient to determine the fine position of the probe, although parts of a cycle are wasted on each side of a measurement to permit settling of transients. Therefore, switch 12 need be closed only for a brief interval. The control of the switch 12 involves some of the remaining components shown within the dashed line box S. A portion of the 25 kc. oscillator 11 signal is applied by a wire 13a to a pulse shaper 13 which forms pulses representing each crossing of the zero axis by the sine wave. The pulse shaper 13 is merely an over-driven amplifier receiving a larger amplitude sine wave and delivering differentiated components of a clipped square wave at its output along the wires 13b, see FIG. 5b. The pulse output from the shaper 13 is delivered to two and-gates 14 and 15 which assuming that their other inputs are energized as will be described hereinafter, respectively deliver pulses in a manner well-known per se, respectively, to a bistable flipflop 16 and to a 50 µsec. delay circuit 17.

Assuming that the flipflop 16 is in "off" position, it is changed to "on" position by a pulse from the gate 14 along the wire 14a. The flipflop 16 then delivers an output through the wires 16a to control the switch 12 so that when the flipflop 16 is in "off" position, the switch 12 is blocked and when the flipflop 16 is in "on" position, the switch 12 is conductive.

Since the gate 15 is also an and-gate, no output appears on the wire 15a unless the flipflop 16 is in "on" position. Therefore, the first pulse from the pulse shaper output 13b actuates the gate 14 but not the gate 15 since there is no signal on the wire 16a. This permits part of the sine wave from oscillator 11 to be wasted for transient-settling purposes. Subsequently the second output pulse of the same polarity from the pulse shaper 13 along the wire 13b can produce an output on the wire 15a because both inputs to the and-gate 15 are energized. Therefore, on the second positive output pulse from the pulse shaper 13 the 50 µsec. delay circuit 17 is turned on. The circuit 17 merely comprises a monostable multivibrator with a 50 µsec. time constant, which delivers an output 50 µsec. in duration and then goes back to its stable state, FIG. 5c. The output of this circuit is delivered along wire 17a to the flipflop 16, and the wiring is such that the signal leading edge does nothing to the flipflop 16, but the trailing edge of the 50 µsec. delay signal actuates the flipflop, restoring it to "off" position and thereby blocking the switch 12. In this manner, the sine wave output from the oscillator 11 along wire 13a is passed through the switch 12 and line 12a to the phase shifters 8 for 50 µsec. which is more than one complete sine wave cycle and long enough to determine the fine position of the probe 10. The fine position determining system S then rests while the coarse position determining system P performs its function. The 50 µsec. delay circuit 17 performs two additional sequencing functions. First, it turns on the sawtooth generator 18 which remains in this state until the 50 µsec. delay circuit 17 goes off, the purpose of the sawtooth generator 18 being explained hereinafter. Second, the trailing edge of its 50 µsec. waveform turns on a 38 µsec. delay circuit 19, the output of which shown in FIG. 5f, causes a delay of about 38 µsec. to permit settling between the end of the performance of the "fine" positoning measurement, and the beginning of the next succeeding "coarse" position measurement, which is about to be described. The manner in which the information gained during "fine" and "coarse" positioning functions is processed will be described hereinafter with particular reference to FIG. 2.

COARSE POSITIONING SYSTEM

The 38 µsec. delay circuit 19 triggered by the output trailing edge of the 50 µsec. delay circuit 17 remains in astable condition for 38 µsec. FIG. 5f, and then its output signal trailing edge delivers a signal along wire 19a which signal blocks the gate 14 and also enables the upper input to an and-gate 20. The lower input to this gate is derived through two multipliers 21 and 22 connected to the 25 kc. oscillator 11. The upper multiplier 21 delivers the fourth harmonic of the 25 kc. oscillator output which is 100 kc. and is fed into the sawtooth generator 18 which runs whenever the 50 µsec. delay 17 is "on" during fine measurements. The lower multiplier 22 delivers the 16th harmonic of the 25 kc. oscillator, which is 400 kc., and this latter multiplier includes in its output a pulse shaper in the form of an over-driven amplifier and R-C differentiating means which delivers narrow timing pulses each time the harmonic crosses the zero axis. The timing pulses of one output polarity along the wire 22a are at a 400 kc. rate, which means that similar polarity pulses are 2½ µsecs. apart. These pulses pass through the gate 23 which is normally conductive and also enable the lower input of the gate 20 which then delivers on the wire 20a pulses spaced apart by 10 µsec. to a ring counter 24 which by each pulse is caused to advance one count. The ring counter 24 has one output wire 24a for each common switch terminal 3c of the main coordinate selector switch 3, and these wires are grouped together by a cable 24b in FIG. 2 which joins and corresponds with cable 9 in FIG. 1. While the ring counter is energized, counting from 1 to 20 in the present example, see FIG. 5g, only one of the wires 24a is provided with a pulse at any particular instant, the pulses progressing sequentially along the wires as the counter 24 counts. When the ring counter 24 reaches the last, or 20th count, it delivers an output along the wire 24c which signifies the last count of the counter, meaning that the coarse position measuring function is completed, and this last count travels along the wire 24d and blocks the gate 23 and also travels along the wire 7 and unblocks the gate 14. This "last count" also internally resets the ring counter 24 in a manner well-known in the prior art.

A sawtooth generator 18 operates simultaneously with the energizing of the quadrature sine wave signals upon the matrix to deliver one continuously rising triangular wave, see FIG. 5d, while the 50 μsec. delay circuit 17 is in astable condition. Similarly, a staircase generator 25 operates simultaneously with the operation of the ring counter 24 during the coarse position measurement function and generates a voltage waveform, FIG. 5h, comprising a series of voltage plateaus or steps, each corresponding with four successive wires of the matrix, or four successive pulses from the 16th harmonic multiplier 22. If the output pulses of the 16th harmonic multiplier 22 were applied directly to the staircase generator 25 then each step of the waveform would be only 2½ μsec. wide and each step would correspond in width to only one wire spacing of the matrix. However, it is necessary that each step of the generated staircase waveform be four wires wide to correspond with the number of different phases put out by the phase shifters 8, and therefore, the generator 25 should step on every fourth pulse from the 16th harmonic multiplier 22. Therefore, the staircase generator is provided with two flipflop binary input circuits 25a and 25b connected in tandem so that a division by a factor of 4 is obtained with respect to the input pulses arriving on wire 26b. The 2½ μsec. pulses from the 16th harmonic generator 22 passing through the gates 23 and 20 are also applied to the gate 26 through the wire 20a. The gate 26 is normally rendered operative by an input arriving along the wires 26a and coming from FIG. 3. This wire 26a, however, receives a signal (in a manner to be subsequently described) when the stylus 10 picks up an output pulse from the ring counter 24 on the matrix board 1, thereby ending the counting of the staircase generator 25 at a step position corresponding with the physical location of the tip of the stylus 10 on the matrix board 1. The count is stopped by removal of the enabling signal from the wire 26a.

PROCESSING OF POSITIONAL DATA

In the normal course of events the system first performs a fine-position measurement involving for the most part, the circuits shown in the dashed box S of FIG. 2. The end of this function is signaled by the beginning of the 38 μsec. delay circuit 19 providing an output, FIG. 5f. The system then performs the coarse position measurement involving substantially the circuit shown in the dashed-box P of FIG. 2. The end of this function is signaled by an output on the "last count" wire 24c of the ring counter 24, and this signal is also delivered upwardly along the wire 7 to reverse the binary 6 in FIG. 1. This binary 6 is a simple bistable multivibrator which delivers outputs on one of two wires 6a or 6b alternately, the output being stepped from one wire to the other, FIG. 5j, each time the binary 6 is pulsed along the wire 7. When the wire 6a is energized, all measurements are being performed on the conductors 1x of the matrix 1; and when the wire 6b is energized, all measurements are being performed on the conductor 1y of the matrix 1. Therefore, the sole function of the binary 6 is to alternate the coordinate axis of the matrix 1 along which measurements are being taken after each set of fine and coarse positional measurements is completed.

It will be recalled that the purpose of this invention was to translate the physical position of the point of the stylus 10 along a coordinate axis into an output voltage which varies with changes in stylus position along that axis. This output voltage is arrived at by additively combining two voltages, one representing the instantaneous level of the coarse position measuring system represented by the staircase output, FIG. 5h, and the other representing the instantaneous level of the sawtooth of the fine position measuring system, FIG. 5d. In simple terms, the output coltage of the fine position measuring system is arrived at by storing the instantaneous level of the sawtooth output of the generator 18, allowing this output to build up until a signal from the stylus relates the position of the stylus to the instantaneous level as indicative of the fine position of the stylus. When the 50 μsec. delay circuit 17 is turned on by a zero-axis-crossing pulse from the shaper 13, FIGS. 5b and 5c, for one full cycle of the sine wave, there are quadrature components of the sine wave applied to every group of four wires on the coordinate board 1. The stylus 10 depending upon its position, will pick up a composite mixture of these components, which composite has a resultant sine wave form of its own whose phase varies with respect to the phase of the parent sine wave as the stylus is moved back and forth. The stylus circuitry determines the instant of zero-axis crossing of this composite wave and, signals the circuitry to record the then level of the sawtooth voltage. This instant, then, does vary in a continuous manner depending upon the probe location with respect to the group of four wires, and the position of the composite component zexo-axis crossing therefore interpolates the position of the stylus among the wires in its groups. The coarse positioning system selects the group of wires, and the fine positioning system interpolates accurate stylus position with respect to the wires in that group. Since the amplitude of the signal picked up by the stylus 10 depends upon whether it is close to or remote from a wire of the matrix there is an error introduced in measuring the instant of zero-axis crossing of the composite component signal due to the slope of the rise-time of its differentiated waveform as accomplished by pulse shaper 34 (FIG. 1) connected with the stylus pickup amplifier 35. To compensate for this error the generated sawtooth form, FIG. 5d, has a fourth harmonic component applied to it from multiplier 21 through wire 21a, to flatten the sawtooth wave periodically as shown in FIG. 5e, so that when the stylus 10 is crossing a conductor 1x or 1y the level of the sawtooth recorded will be compensated for the unavoidable seeming decrease in the apparent rate of movement of the stylus past that conductor due to increased amplitude of the signal picked up by the stylus.

The output voltage representing the coarse position of the sylus 10 is arrived at in a somewhat analogous manner by permitting the output level of the staircase generator 25, FIG. 5h, to build up in steps which increase by a predetermined amount of amplitude for each fourth wire energized sequentially by the ring counter 24. The staircase generator continues building up its steps until a signal from the stylus indicates that it has counted to a wire adjacent to the stylus position, and this signal from the stylus then stops the output from the staircase generator 25. The steps of the output waveform of the staircase generator 25 are each made wide enough to encompass the application of coarse pulses to four wires. When the level of a triangular wave from the sawtooth generator is added to the level of a particular step of the staircase generator, a continuous and linearily varying voltage waveform results and this voltage is a function of the position of the probe 10 along the coordinate axis of the matrix 1 on which the measurements are being taken.

In other words, although it would be desirable if a perfectly linear voltage gradient could be established across the entire width of the matrix board, this is not easily accomplished with accuracy. If the establishment of a single linear gradient across the whole matrix were a practical way of energizing the matrix board, then the position of the probe could be easily established merely by measuring the voltage level of the continuous gradient corresponding with the present location of the tip of the stylus to designate its position. However, since it is not practical to establish a perfectly linear gradient across a matrix board, for instance three feet wide, the present invention seeks to establish a coarse-position representing voltage which changes at every fourth matrix conductor, and then establish a fine-position indicating voltage which represents the position of the stylus 10 within any group of four wires, and finally combines the two voltages in order to indicate actual stylus position. In short, this involves combining the staircase step voltage, FIG. 5h, corresponding with the pulse, FIG. 5g, nearest which the probe is located additively with the sawtooth instantaneous voltage level corresponding with the phase position locating the probe voltage representing the actual probe position.

The circuitry shown in FIG. 3 for developing the analog output voltage includes four different basic storage circuits. These circuits can be divided into two different classifications, namely the fine position storage circuits contained within the dashed box F and the coarse position measuring circuits contained within the dashed box C. The circuits within each of these boxes can be further divided into two similar branches, one representing $x$ axis information and the other representing $y$ axis information. In addition, there is a final storage system in which the $x$ and $y$ information from the fine and coarse storage units in the boxes F and C are combined to produce the final analog signals, this final storage system being contained within the dashed box A.

Four and-gates control the entry of information into the $x$ and $y$ coarse and fine storage units in the boxes F and C. A gate 30 controls the entry of information into the fine storage unit 31 for the $x$ axis coordinate, and a gate 32 controls the entry of information into the fine storage unit 33 for the $y$ axis. Likewise, a gate 50 controls the entry of coarse storage information into the coarse storage unit 51 for the $x$ coordinate and a gate 52 controls the entry of information into the coarse storage unit 53 for the $y$ axis. The gates 30, 32, 50 and 52 are always sequentially operated, and no two of these gates are ever conductive at the same time.

Considering the numerous inputs to the gates 30 and 32 in the fine storage system, the gate 30 has its input 30a connected with wire 6a so that the gate 30 will be operative only when the binary 6 is in the position for observing x-axis information. Likewise, the gate 32 has an input 32a which is connected with the wire 6b such that the gate 32 will be conductive only when binary 6 is in a position to cause observation of y-axis values. The input 30b and the input 32b are connected in parallel, and are both connected with wire 17b which is energized during the time when the 50 μsec. delay multivibrator 17 is in astable condition, namely while the flip-flop 16 is energized and the switch 12 is conductive, this information being applied to both gates 30 and 32 to enable either one of these gates only during intervals when fine positional information is being measured by the system.

In addition, inputs 30c and 32c are connected in parallel, and are coupled with wire 34a which goes up into FIG. 1 to the pulse shaper 34 which is fed by amplifier 35 which in turn derives its input from the stylus 10. The amplifier 35 is a limited-bandwidth amplifier which is sensitive to signals within the range of 25 kc.–400 kc. plus the necessary higher frequency response to accommodate the rise-times thereof, but it has very poor response above and below this limited range so as to attenuate spurious signals. The amplifier 35 drives the pulse shaper 34 which is merely an over-driven amplifier which changes a sine wave input to a pulse output, and thereby makes it easy to sense the instant at which the input signal to the pulse shaper 34 crosses its zero axis. This feature is of importance as will appear hereinafter. The probe 10, amplifier 35 and pulse shaper 34 pass the signals which actually enable the gates of the storage system and permit the storage of information by which the position of the probe is actually determined.

In addition to the above-mentioned inputs to the gates 30 and 32, there is an input 30d and an input 32d, both connected in parallel and to the output of a 42 μsec. delay circuit 36 which serves in a manner presently to be explained to block the gates 30 and 32 after the first input pulse has been received from the stylus 10 along the wire 34a for a sufficient length of time to permit the system to change over to coarse information processing, thereby preventing the accidental measuring of two bits of input information from the stylus 10 during the same fine-information cycle. Finally, the gates 30 and 32 have inputs 30e and 32e, again connected mutually in parallel to a line 37a providing information from a dual delay circuit 37 which is capable of introducing one of two different small delays of 5 or 6.5 μsec. in order to shift the instant at which a measurement is taken back and forth between two different adjacent positions on the sawtooth and staircase voltages so as to eliminate the possibility of obtaining an indefinite output signal which might result from a tendency of the voltages to jitter back and forth in the event that the stylus position is on the margin between the beginning of one sawtooth wave and the ending of another, as when the stylus is changing position from one group of four wires to another. This dual delay function will be described in greater detail hereinafter. If a proper combination of signals occurs on all five inputs to the gate 30, it will deliver a signal to the blocking oscillator 38 which in turn delivers a sharp pulse along the wire 38a which opens a gate 31a within the fine storage unit and connects the wire 18a to a storage capacitor 31b within the unit 31. Each of the storage units 31, 33, 51 and 53 includes a capacitor to which the sawtooth voltage output along the wire 18a or the staircase output along the wire 25c is applied. For instance, the capacitor 31b within the fine storage unit 31 is charged by the sawtooth voltage on wire 18a when the gate 30 passes a signal which fires the blocking oscillator 38 thereby delivering a brief pulse along the wire 38a to open the gate 31a and charge the capacitor 31b to the instantaneous level of the sawtooth. The position of the stylus 10 determines when the quadrature sine wave component being picked up will pass through the zero axis and deliver a pulse from the pulse shaper 34. For instance, if the tip of the stylus 10 was over the first matrix wire, or over one of the other "first" matrix wires to which a zero-degree phase was applied, the input signal to wire 34a would pass through the zero axis earlier by 20 μsec., than it would if the tip of the stylus was over one of the matrix wires to which the 180° phase was applied, and so on.

Finally, if the $y$ axis fine measurement is being made, and the inputs 32a, 32b, 32d, and 32e are all enabled, then the instant at which the blocking oscillator 39 is fired to open the gate 33a leading to the capacitor 33b within the fine storage unit 33 will depend upon the input 32c which will be energized by a pulse from the pulse shaper 34 at the instant when the composite of the sine wave signals being picked up by the stylus 10 passes through the zero axis.

Whenever either the blocking oscillator 38 or 39 is operated a pulse is delivered through an or-gate 40 to the input wire 36a of the 42 μsec. delay 36. As stated above the purpose of this delay is to make sure that the next zero crossing of the axis as sensed by the probe 10 does not again fire either the gate 30 or 32, since it is intended that only one measurement be taken through either of these gates for each cycle of the system during a fine measurement. Since the 25 kc. oscillator 11 has two zero crossings of the same polarity within every 40 μsec. of time, a 42 μsec. delay as introduced by delay circuit 36 will prevent the second zero crossing from actuating either the gate 30 or 32.

Because the final output analog signal in either the $x$ or the $y$ position is the sum of a fine storage signal which is an instantaneous voltage level of the sawtooth generator 18 with a coarse storage signal which is an instantaneous voltage level of the staircase generator 25, it is desirable that the correct voltage levels be added together. The sawtooth voltage builds up while it is enabled by the delay circuit 17 over a period of 50 μsec., see FIGS. 5d and 5e, which corresponds with one cycle of the 25 kc. oscillator 11 plus 10 μsec. On the other hand, the staircase generator builds up four increasing steps during a similar but subsequent interval.

It is possible to arrive at the same analog composite voltage by combining one of two different levels of the sawtooth voltage with one of two different steps of the staircase generator depending on which instant of time the gates 50 and 52 are opened, namely immediately before the staircase generator steps, or immediately thereafter, depending on only a slight change of position of the stylus tip. The step occurs almost instantaneously, and on opposite sides of this instant the staircase voltage changes rather drastically, but during this same instant, the sawtooth output will also change. Thus, it would be possible to obtain an analog composite signal by adding one of the sawtooth generator levels to one of two different adjacent steps of the staircase generator, and it is desirable that this condition not be permitted to jitter back and forth if the stylus is located where the transition occurs. In order to avoid this type of indefiniteness and in order to make stable the levels of these two voltages when combined, a step control circuit is added by which at the instant of transition, a lower level of the sawtooth generator will tend to be combined with a next higher step, or alternatively by which a higher level of the sawtooth generator will tend to be combined with a next lower step, these levels being selected such that the composite voltage of either type of combination will be the same at the transition point.

The 25 kc. oscillator 11 puts out a sine wave which is 40 μsec. in duration and which crosses the zero axis every 20 μsec. The sawtooth generator 18 is triggered by the pulse shaper 13 to begin to deliver its triangular waveform at a zero-axis crossing in one selected and standarized direction representing the beginning of the 25 kc. oscillator cycle, and the triangular waveform builds up through its next zero axis crossing located in the middle of the sine wave cycle and continues building until the third zero axis crossing which represents the end of the cycle shortly after which time the sawtooth generator is turned off by the delay circuit 17.

The system for preventing the aforesaid type of jitter employs a 24 μsec. delay 28 comprising a monostable flipflop which is sensitive to the polarity of the output pulses from the pulse shaper 13. Since the pulse shaper 13 includes a differentiating circuit to sharpen its pulses, it puts out a pulse of one polarity for the first and third zero axis crossings of the 25 kc. oscillator cycle, and a pulse of the opposite polarity at the time of the second zero axis crossing in the middle of the 25 kc. sine wave cycle. The 24 μsec. delay circuit 28 is sensitive to the first zero axis crossing polarity pulse from the pulse shaper 13 through the gate 15 and the wire 15b. Thus at the beginning of each cycle of the sine wave signal corresponding with a cycle of the sawtooth generator, the 24 μsec. delay circuit 28 is triggered into its astable condition, and at the end of the 24 μsec. it reverts to its stable condition. The lower input to the and-gate 27 is thus enabled during the astable state of the 24 μsec. delay. The upper input to gate 27 is connected by wire 36a with the output of the or-gate 40. As the fine position measuring cycle proceeds, an output will occur at one of the blocking oscillators 38 or 39 at some time during the complete cycle of the sawtooth generator which corresponds also with one complete cycle of the 25 kc. oscillator 11. The instant at which the blocking oscillator 38 or 39 fires as determined by the position of the probe 10 on the matrix wires can occur at any point along the sawtooth. The blocking oscillator will fire before the second zero axis cross-over of the oscillator 11 if the probe receives quadrature sine waves with a zero axis crossing within the first half of the sawtooth wave. Conversely, the blocking oscillator will fire after the second zero axis cross-over if the probe is receiving sine waves having a zero axis crossing within the second half of the sawtooth wave. Whenever either of the blocking oscillators fires, a pulse is delivered through the or-gate 40, through the wire 36a, and into the second input of the gate 27. If the first input to the gate 27 is also enabled by the delay circuit 28 which occurs during the first half of the sawtooth wave, then an output will appear on the wire 27a, which output is delivered into the second binary 25b input to the staircase generator 25 which causes this second binary to be reversed from its normal reset condition which it occupies while measurements are being made by the fine positioning system. Such an advance of the second binary has the effect of moving the staircase generator ahead by one-half step, as shown in FIG. 5i, as compared with FIG. 5h. In other words, when the staircase generator is subsequently rendered operative by the gate 26 during the next succeeding coarse-position measuring function, the staircase generator begins counting from an advanced position which gives it a head start as compared with the counting position which it would normally begin at if the circuits 27 and 28 were not present.

In effect, then, whenever the phase of the fine signal picked up by the stylus 10 crosses the zero axis during the first half of the rising sawtooth waveform from generator 18, the staircase generator is advanced one-half a step so that the lower voltage level from the sawtooth generator 18 combines with the staircase generator output advanced by one-half a complete step. Conversely, if a blocking oscillator 38 or 39 delivers its pulse through the or-gate 40 and the wire 36a during the second half of the rise time of the triangular wave from the sawtooth generator 18, then the delay circuit 28 will not have enabled the gate 27, and thereby no output will appear along the wire 27a, meaning that the staircase generator will not be advanced with the result that the higher second-half levels from the sawtooth generator 18 will be combined with an unadvanced step level of the staircase generator 25. In this way, the combinations of voltage levels from the sawtooth generator with step levels of the staircase generator are accurately controlled so that there is no tendency to jitter back and forth between two steps of the staircase generator during successive coarse measurements as might otherwise occur. The determination as to whether or not to shift hte starcase levels is made, however, during the fine measurements.

Having just described the manner in which a smooth transition is obtained between one step and the next adjacent step of the staircase generator which occurs during only a small change in position in the sawtooth voltage level, it is necessary to consider the manner in which a smooth change can be made when the fine measurement is about to change from a high sawtooth level to a low level or vice versa, due to a small change in position of the probe on the matrix occurring at a transition from a point at the end of a sawtooth wave-form to a point at the beginning of one. The change from the peak near the end of one sawtooth to the low point at the beginning of another sawtooth, or vice versa, depending on which way the stylus is being moved on the matrix should be a definite change while at the same time avoiding any possibility that the transition between sawtooths might jitter back and forth.

The prevention of this tendency to jitter due to the location of the probe exactly on an unstable transition point is accomplished by the switch 41 together with the 5–6,5 μsec. delay 37. Assuming, for example, that the transition is about to occur between the high point of one sawtooth and the low point of another sawtooth, as long as the change has not yet occurred, the output voltage level of the fine storage unit 31 or 33 will be relatively high, although about to change over to its lowest value after the transition occurs. Conversely, once the transition has occurred, the voltage level on the fine storage unit 31 or 33 will shift to a relatively low level since the voltage is being taken at the beginning of a sawtooth waveform, rather than toward the end thereof. These two facts are used to control the amount of delay introduced by the 5 or 6.5 $\mu$sec. delay circuit 37. The output of the delay 37 is delivered across the wire 37a to the inputs 30e and 32e of the gates 30 and 32, regardless of whether the delay introduced by the delay circuit 37 amounts to 5 $\mu$sec. or 6.5 $\mu$sec. The amount of delay selected and actually introduced serves the purpose of waiting an instant after the initiation of a new sawtooth to give the wave time for its initiating transients to die down so that the waveform becomes truly linear.

Because of the cyclic nature of the measuring system using successive sawtooth waves, the precise point of the sawtooth wave at which a measurement begins does not matter so long as the selected point is stable. It is, however, necessary that one complete cycle of a sawtooth waveform be used. Since the sawtooth waveform is 50 $\mu$sec. in duration and the fine measuring cycle is only 40 $\mu$sec. in duration, it is possible to throw away a few microseconds at the beginning and at the end of each sawtooth in order to remain within a more linear portion thereof for the 40 $\mu$sec. during which fine position measurement actually occurs. If, under one set of circumstances, 5 $\mu$sec. is unused at the beginning of a sawtooth waveform, and if under another and differing set of circumstances 6.5 $\mu$sec. remains unused at the beginning of a sawtooth waveform, it can be seen that the entire fine measuring process is thus shifted back and forth on the sawtooth wave. This fact is used in the following manner.

At the transition moment which was assumed above to be occurring between high and low levels of sawtooth waveforms, it will be seen that by shifting the entire measuring process back and forth on the sawtooth waves, for instance by shifting to the 6.5 $\mu$sec. delay, the high reading can be maintained a little longer until the system must shift to a low reading on the next sawtooth, and, additionally, that by then shifting to the 5 $\mu$sec. delay and thus differently shifting the position of the readings with respect to the sawtooth, it will be possible to suddenly move the readings being taken further away from the transition point after a shift occurs so as to prevent jittering back and forth between the high and low readings.

This is accomplished by the switch 41 which has two inputs 41a and 41b, the former applying the x axis fine storage level to the switch and the latter applying the y axis fine storage level to the switch. The switch is operated to select either the x information or the y information by whichever of the input wires 6a and 6b, respectively, is energized. Assuming for example, that the wire 6a is energized, the switch 41 is then moved to such a position as to connect the wire 41a with the output 41c from the switch. If the wire 6b had been energized, then the output 41c would have been connected to the wire 41b. The dual delay circuit 37 is an astable multivibrator having two different time constants depending upon the magnitude of the bias applied to the transistors in the multivibrator. This bias is supplied through the wire 41c and if it is relatively high, the delay becomes 6.5 $\mu$sec., but if it is relatively low, the delay becomes 5 $\mu$sec. Assuming that the switch 41 is connecting the x fine storage unit 31 to the wire 41c, if the storage level is a relatively high voltage, meaning that the measurement is being taken near the peak of a sawtooth, the delay becomes 6.5 $\mu$sec. which shifts the measurement away from the transitional zone downwardly along the same sawtooth. This shift tends to delay the transition beyond the point where it would normally occur. When the shift finally does occur due to further movement of the stylus 10 along the matrix board in a direction requiring a shift to the beginning of a sawtooth, then the voltage on the x fine storage unit 31 will suddenly change to a relatively low level and the bias applied by the wire 41c to the delay multivibrator 37 will shift so as to change the amount of delay to 5 $\mu$sec. This change in the amount of delay will cause relative shifting in the opposite direction between the new sawtooth voltage and the instant at which the measurement is taken, and this shift will again be away from the transitional zone and upwardly along the new sawtooth and, again, away from the point of transition. Thus, the dual delay circuit 37 tends to resist the change transition until the change absolutely must occur, and the instant the change does occur, the circuit 37 then moves the point of the measurement away from the transition so as to be sure that there is no tendency to retreat back to the former condition.

Referring now to the coarse storage system, as stated above, after a fine storage measurement has been completed, and the 50 $\mu$sec. delay circuit 17 completes its astable condition and returns to stable condition, thereby removing the enabling signal from the wire 17b and rendering both gates 30 and 32 non-conductive. The coarse positioning system is then enabled after the 38 $\mu$sec. delay imposed by the delay circuit 19.

The gates 50 and 52, are each provided with multiple inputs, all of which have to be enabled before either gate becomes conductive. The wiring within the ring counter is such that the voltage appearing at the wire 24c during a counting sequence enables both the gate 23 and the gates 50 and 52 in the normal course of events, but shuts off these gates when the "last count" signal appears on the wire 24c. Therefore, whenever the ring counter 24 is counting on any count except the "last count," the gates 50 and 52 are both enabled at their inputs 50a and 52a. In addition, the gate 50 has an input 50b which is connected with the wire 6a so as to enable this input only when the binary 6 has switched the system to observe positions along the x axis. The gate 52 has an input 52b which is connected with the wire 6b so that whenever the binary 6 has switched the system to observe positions along the y axis, this input gate 52 will be enabled. In addition, both gates 50 and 52 have inputs 50c and 52c which are respectively connected in parallel and are connected with the wire 34a leading from the pulse shaper 34 which delivers very narrow pulses (0.3 $\mu$sec. wide) in response to pulses received by the stylus 10.

It will be recalled that during coarse position measurements, a series of individual pulses from the ring counter outputs 24a are successively applied to the various coordinate conductors, only one of which is energized by a pulse at any particular instant during coarse position measurements. The probe 10, depending upon its position with respect to the coordinate conductors capacitively picks up a pulse from a neighboring wire and delivers the pulse through the pulse shaper 34 and the wire 34a to whichever gate 50 or 52 is enabled at its other two inputs. The gate which is thus enabled, for instance when x-measurements are being taken, then delivers an output pulse to the 10 $\mu$sec. delay 54 to which it is connected, and after 10 $\mu$sec. the pulse is passed upwardly to the blocking oscillator 56 in order to fire this oscillator and deliver a pulse along the wire 56a. The 10 $\mu$sec. delay circuits 54 and 55 are interposed between the preceding gates and the succeeding blocking oscillators in order to provide a small time interval during which the staircase generator output can be stabilized, after the generator 25 is stopped by a signal along wire 26a, before the level thereof is recorded in one of the coarse storage units 51 or 53. This provision eliminates the possibility of transients being accidentally recorded in the storage units. When one of the blocking oscillators 56 or 57 is fired, the output thereof along the wire 56a or 57a enables a gate, such as the gate 51a or 53a within the coarse storage unit, and such gate when enabled couples the wire 25c to a capacitor 51b or 53b long enough for the capacitor to be charged to the existing staircase voltage level, and then when the blocking oscillator resumes its steady state the gate is blocked and the capacitor remains at its charged level.

The coarse storage system is provided also with an or-gate 58 connected with a flipflop 59. The flipflop 59 is of the bistable type and is turned to "on" condition at the end of the fine measurement portion of the cycle by the trailing edge of the pulse on wire 17b from the 50 μsec. delay 17. When the fliflop 59 is in "on" condition, it delivers an output along the wire 26a which is connected to one of the inputs of the gate 26, thereby enabling the gate 26 to pass a pulse from the wire 20a along the wire 26b to commence the staircase generator operating. The staircase generator then begins generating the stepped waveform as shown in FIG. 5h and continues to build up the value to higher and higher steps until one of the gates 50 or 52 becomes conductive and passes a signal from the stylus 10 and the amplifier 35 to the pulse shaper 34, along the wire 34a and through one of the gates 50 or 52 to the or-gate 58. When an input is received in the or-gate 58, it delivers an output along the wire 58a and reverses the flip-flop 59 to "off" condition. Thus, the enabling signal is removed from the wire 26a, and the gate 26 is blocked and thereby stops the staircase generator 25 from operating. The 10 μsec. delay interposed by the delay 54 or 55 allows an instant for the waveform of the stopped staircase generator to settle, and then its voltage level appearing on the wire 25c is entered into one of the capacitors 51b or 53b is blocked by the return of the blocking oscillator 56 or 57 to its stable condition.

The capacitors in the four storage units 31, 33, 51 and 53 retain the voltages to which they are charged on each measuring cycle until changed by the next cycle. The final analog output voltage is obtained by additively combining the fine and coarse voltages on the capacitors. For instance, the final x signal analog voltage appears at the output of the final analog storage unit 45; and the final analog output voltage for the y signal appears at the output of the analog storage unit 46, the analog output terminals respectively being labeled 47 and 48. Each of the storage units 45 and 46 has two inputs. The x signal storage unit 45 has an input 31c connected with the capacitor 31b within the fine storage unit 31, and another input 51a connected with the capacitor 51b of the coarse storage unit 51. These two inputs to the unit 45 are connected with an amplifier circuit comprising the unit 45, which amplifier circuit has its output connected with the final output terminal 47, its voltage being governed at all times by the levels of the capacitors 31b and 51b. Likewise, the y signal storage unit 46 includes an amplifier having an analog output terminal 48, and having inputs connected to the wire 33c coupled with the capacitor 33b and to wire 53c connected with the capacitor 53b in the coarse storage unit 53. The amplifier also has its output level determined at all times by the voltage levels of the capacitors 33b and 53b. The analog level appearing at the terminal 47 represents the position along the x axis of the stylus 10, and the D.C. level at the terminal 48 represents the position of the stylus 10 along the y axis, and when these two terminals are connected with the deflection terminals of an oscilloscope, the spot on the screen of the oscilloscope can be adjusted to follow and reproduce the motion of the stylus on the matrix board.

The present invention is not to be limited to the precise circuitry shown in the drawings, which circuitry is only illustrative of the broader invention recited in the following claims.

We claim:

1. A system for locating the position of a stylus as defined in terms of a coordinate, distances along which are represented by a family of spaced coordinate conductors, comprising:
    (a) means for sequentially applying an identifying wave to each conductor and for concurrently generating a first voltage waveform of changing level;
    (b) means for picking up one of said waves in the stylus from an adjacent conductor;
    (c) means operated by said picking up means for storing the level of the first waveform at the instant when the wave was picked up;
    (d) means for generating and applying plural phase-shifted components of a cyclic wave in a repeating sequence to plural conductors in repeating groups and for concurrently generating a second waveform changing in level and initiated at the time the cyclic wave passes through a definite point in its cycle;
    (e) means for picking up a composite of the phase shifted components at the stylus and determining the instant at which the composite passes through a similar definite point in its cycle;
    (f) means operated by the latter picking up means for storing the level of the second waveform at the latter instant; and
    (g) means for combining the two stored levels to produce an output level proportional to said stored levels and representing the position of the stylus along that coordinate.

2. In a system as set forth in claim 1, said combining means comprising amplifier means having a single output, and two D.C. coupled inputs respectively connected to be controlled by said stored levels.

3. A system for locating the position of a stylus as defined in terms of dimensional coordinates each represented by a family of spaced coordinate conductors, comprising:
    (a) means for sequentially applying a pulse to each conductor and for concurrently generating a first voltage waveform of changing level;
    (b) means for picking up one of said pulses in the stylus from an adjacent conductor;
    (c) means operated by said picking up means for storing the level of the first waveform at the instant when the pulse was picked up;
    (d) means for generating and applying quadrature phase components of a cyclic wave in a repeating sequence to said conductors in groups of four and for concurrently generating a second waveform changing in level and initiated at the time the cyclic wave passes through its zero axis;
    (e) means for picking up a composite of the quadrature components at the stylus and determining the instant at which the composite passes through its zero axis after the cyclic wave passes through its zero axis;
    (f) means for storing the level of the second waveform at the latter instant;
    (g) means for combining the two stored levels to produce an output level proportional to said stored levels and representing the position of the stylus along that coordinate; and
    (h) means for switching the above-mentioned means to another coordinate family of conductors.

4. A system for locating the position of a stylus freely movable along a dimensional coordinate defined by a family of conductors spaced apart along said coordinate, comprising:
    (a) pickup means at the tip of the stylus for picking up waves applied to adjacent conductors;
    (b) means for sequentially applying a pulse to each conductor;
    (c) first control gate means for starting the pulse applying means and for stopping it when each conductor has been pulsed;
    (d) first waveform generating means rendered operative by the first gate means to generate a first waveform of magnitude changing concurrently with the pulse applying means;

(e) means connected with the waveform generating means and operated by said pickup means to store a voltage proportional to the magnitude of said first waveform at the instant when a pulse applied to a conductor is picked up at the stylus tip;

(f) means for generating a multiplicity of mutually-phase-shifted components of a cyclic waveform and simultaneously applying the different components in a progressively repeating pattern to groups of the conductors;

(g) second waveform generating means for generating a second waveform of magnitude changing during the generating and applying of the components;

(h) second control gate means for controlling the applying of said components to the conductors and for initiating the second waveform generation when said cyclic waveform passes through a definite point in its cycle;

(i) means operated by said pickup means for determining the instant when the composite of the phase-shifted components picked up at the stylus tip from adjacent conductors passes through the same definite cyclic point of its waveform and for storing a voltage proportional to the magnitude of said second waveform at said instant; and (j) means coupled to receive said first and second voltages and delivering an output voltage proportional to their combined magnitudes and representing the position of the stylus tip along said coordinate.

5. A system for locating the position of a stylus freely movable along a dimensional coordinate defined by a family of conductors spaced apart along said coordinate, comprising:

(a) pickup means at the tip of the stylus for picking up waves applied to adjacent conductors;

(b) means for sequentially applying a wave to each conductor;

(c) control gate means for periodically starting the wave applying means and for stopping it when each conductor has in turn been energized;

(d) waveform generating means rendered operative by the gate means to generate a waveform of magnitude changing concurrently with the applying of said waves; and (e) means operated by said pickup means to deliver a voltage proportional to the magnitude of said waveform when a wave applied to a conductor is picked up at the stylus tip, said voltage representing the position of the tip relative to the conductors of the family.

6. A system for locating the position of a stylus freely movable along a dimensional coordinate defined by a family of N conductors spaced apart along said coordinate, comprising:

(a) pickup means at the tip of the stylus for picking up waves applied to adjacent conductors;

(b) means for generating a number N of mutually-phase-shifted components of a cyclic waveform and applying the different components simultaneously to the conductors of said family;

(c) waveform generating means for generating a waveform of magnitude changing during the generating and applying of the phase shifted components;

(d) control gate means for periodically applying said components to the conductors and for initiating the waveform generation at the moment when said cyclic waveform passes through a definite point in its cycle;

(e) means operated by said pickup means for determining the instant when the composite of the phase-shifted components picked up at the stylus tip from adjacent conductors passes through the same definite cyclic point of its waveform, and for delivering a voltage proportional to the magnitude of said second waveform at said instant and representing the position of the tip relative to the conductors in the family.

7. A system for locating the position of a freely movable stylus with respect to a dimensional coordinate defined by a family of conductors spaced apart along said coordinate comprising:

(a) a capacitive pickup tip on said stylus; and (b) stylus position measuring means including signal generating means for applying successively to said conductors discrete signals spaced in time, and including means for generating a waveform changing in magnitude as the signals successively energize the conductors, means connected with the stylus tip for transmitting the signal picked up by the tip from an adjacent conductor, and storage means connected to the waveform generating means through a gate controlled by said transmitting means for storing a voltage representing said magnitude at the instant when said signal is transmitted through the tip and representing the position of the tip relative to the conductors in the family.

8. A system for locating the position of a stylus freely movable with respect to a dimensional coordinate defined by a family of N conductors spaced apart along said coordinate comprising:

(a) a capacitive pickup tip on said stylus; and (b) stylus position measuring means including sine wave generating means and phase shifting means for delivering components of the sine wave in N different phase relations to the N conductors, and including means for generating a waveform of magnitude varying over the duration of one cycle of said sine wave and initiated at the instant when the sine wave cycle crosses its zero axis in a selected direction, means coupled with the stylus tip for picking up sine wave components from adjacent conductors and determining the instant of crossing of the zero axis in said selected direction of the composite of said components, and storage means connected to said waveform generating means through a storage gate controlled by said means coupled with the stylus tip for storing a voltage representing the magnitude of said waveform at the instant of crossing of the composite components zero axis, and representing the position of the tip relative to the N conductors in the family.

9. A system for locating the position of a stylus freely movable with respect to a dimensional coordinate defined by a family of conductors spaced apart along said coordinate, comprising:

(a) a capacitive pickup tip on said stylus;

(b) coarse stylus position measuring means including signal generating means for applying successively to said conductors discrete signals uniformly spaced in time, and including means for generating a first waveform changing in magnitude as the signals sequentially energize the coordinate conductors, means connected with the stylus tip for transmitting the signal picked up by the tip from an adjacent conductor, and first storage means connected to the first waveform generating means through a storage gate controlled by said transmitting means for storing a first voltage representing said magnitude at the instant when said signal is transmitted through the tip;

(c) fine stylus position measuring means including sine wave generating means and phase shifting means for delivering components of the sine wave in N different phase relations to the conductors in a pattern of simultaneous repeating waves of different phases on every group of N conductors, and including second means for generating a second waveform of magnitude varying over the duration of one cycle of said sine wave and initiated at the instant when the sine wave cycle crosses its zero axis in a selected direction, pickup means coupled with the stylus tip for picking up sine wave components from adjacent conductors and determining the instant of crossing of the zero axis in said selected direction of the composite of said components, and second storage means connected to the second generating means through a storage gate controlled by said pickup means for storing a second voltage representing the magnitude of said second waveform at the instant of crossing of the components zero axis; and (d) means for combining said first and second voltages to produce an analog output representing the position of said stylus with respect to said coordinate.

10. In a system as set forth in claim 9, said means for picking up sine wave components including amplifier means, squarer means, and differentiator means for delivering pulses representing instants of zero-axis crossings of the composite components.

11. A system for locating the position of a stylus freely movable with respect to one or more dimensional coordinates each defined by a family of conductors uniformly spaced apart along said coordinate, comprising:

(a) means for supporting the conductors of each coordinate in uniformly spaced mutual relationship;
(b) a capacitive pickup tip on said stylus;
(c) coarse stylus position measuring means including pulse generating means for applying successively to each of said conductors a discrete pulse, and including means for generating a staircase wave increasing in magnitude with every fourth sequential energization of a coordinate conductor, means connected with the stylus tip for transmitting a pulse picked up by the tip from an adjacent conductor, and coarse storage means connected to the staircase wave generating means through a storage gate controlled by said transmitting means for storing a first voltage representing said magnitude at the instant when a pulse is transmitted through the tip;
(d) fine stylus position measuring means including sine wave generating means and phase shifting means for delivering quadrature components of the sine wave simultaneously to the conductors in a pattern repeating the same phase on every fourth conductor, and including means for generating a sawtooth wave continuously varying in magnitude over the duration of one cycle of said sine wave and initiated at the instant when the sine wave cycle crosses its zero axis in a selected direction, pickup means coupled with the stylus tip for picking up sine wave components from adjacent conductors and for determining the instant of crossing of the zero axis in said selected direction of the composite of said components, and fine storage means connected to the sawtooth generating means through a storage gate controlled by said pickup means for storing a second voltage representing the magnitude of said sawtooth wave at the instant of crossing of the composite components zero axis;
(e) means for combining said first and second voltages to produce an analog output representing the position of said stylus with respect to said coordinate; and
(f) cyclic means for switching the coarse and fine position measuring means to a different family of conductors after coarse and fine measurements have been made along each coordinate.

12. In a system as set forth in claim 11, said means for picking up sine wave components including amplifier means, squarer means, and differentiator means for delivering pulses representing instants of zero-axis crossings of the composite components.

13. A system for locating the position of a stylus freely movable with respect to a dimensional coordinate defined by a family of conductors spaced apart along said coordinate, comprising:

(a) a capacitive pickup tip on said stylus;

(b) coarse stylus position measuring means including pulse generating means for applying successively to each of said conductors a discrete pulse, and including means for generating a staircase wave changing in magnitude as the signals sequentially energize each Nth coordinate conductor, means connected with the stylus tip for transmitting a pulse picked up by the tip from an adjacent conductor, coarse storage means connected to the staircase wave generating means through a storage gate for storing a first voltage representing the magnitude of the wave, means operated by said transmitting means when a pulse is transmitted through the tip to stop further change in magnitude of the staircase wave; and means operated by said stop means to delay operation of said storage gate long enough for the staircase wave to settle storing its magnitude;

(c) fine stylus position measuring means including sine wave generating means and phase shifting means for delivering components of the sine wave in N different phase relations to the conductors in a pattern of simultaneous repeating waves of different phases on every group of N conductors, and including means for generating a sawtooth wave of magnitude varying over the duration of one cycle of said sine wave, means for applying the sine wave cycle components to the conductors and initiated at the instant when the sine wave cycle crosses its zero axis in a selected direction, pickup means coupled with the stylus tip for picking up sine wave components from adjacent conductors and for determining the instant of crossing of the zero axis in said selected direction of the composite of said components and said pickup means blocking said components applying means, and fine storage means connected to the sawtooth generating means through a storage gate controlled by said pickup means for storing a second voltage representing the magnitude of said sawtooth wave at the instant of crossing of the composite components zero axis; and (d) means for combining said first and second voltages to produce an analog output representing the position of said stylus with respect to said coordinate.

14. A system for locating the position of a susbstantially free stylus with respect to plural families of spaced conductors representing dimensional coordinates comprising:

(a) a matrix panel supporting the conductors in fixed non-intersecting relationship;
(b) a capacitive pickup tip on said stylus;
(c) a coordinate switch including as many switching circuits as there are conductors in any of the coordinate families, each circuit including separate output terminals for each coordinate connected with conductors of different families and each circuit including an input terminal;
(d) sine wave oscillator means including phase shifters for delivering sine-wave quadrature components connected simultaneously in repeating sequence to the switch input terminals, and including pulse shaper means for delivering a pulse each time the sine wave from the oscillator passes through its zero axis in one predetermined direction, and including harmonic multiplier means for delivering higher harmonics of the sine wave;
(e) amplifier, squarer and differentiator means coupled with the stylus tip and delivering an output pulse each time the composite of the quadrature components picked up by the tip passes through its zero axis in the same predetermined direction;
(f) fine position determining means including sawtooth generating means controlled by timed gate means coupled to the pulse shaper and set in operation by an output pulse therefrom for generating a sawtooth voltage wave during one complete sine wave cycle, and a fine storage means for each coordinate and each including capacitor means coupled with said sawtooth generating means by a gate controlled by said differentiator means for storing in the capacitor means a voltage proportional to the wave magnitude at the instant when the differentiator means delivers a pulse as a result of the composite components crossing its zero axis;

(g) coarse position determining means including a delay circuit set in operation by said timed gate means after the completion of said one complete sine wave cycle; ring counter means set in operation by said delay circuit and pulsed by said harmonic multiplier means to deliver at plural outputs a sequence of pulses to the individual switch inputs, staircase waveform generating means connected to be triggered by the harmonic multiplier means for generating stepped voltage levels changing after each fourth conductor is pulsed by the counter means; and separate coarse storage means for each coordinate and each including capacitor means coupled with said staircase generating means by a gate controlled by said amplifier and differentiator means for storing a voltage proportional to the wave magnitude at the instant when a pulse from an adjacent conductor is picked up by said stylus tip;

(h) separate analog amplifier means for each coordinate and coupled to the fine and coarse storage means for that coordinate and delivering an output signal proportional to the instantaneous combined fine and coarse storage voltage levels; and (i) system programming means controlled by said timed gate means and including means for operating the switching means and the storage gates to select the conductors of another coordinate each time coarse and fine position determinations have been completed on one coordinate.

15. A system for locating the position of a substantially free stylus with respect to plural families of spaced conductors representing dimensional coordinates comprising:

(a) a matrix panel supporting the conductors in fixed non-intersecting relationship;

(b) a capacitive pickup tip on said stylus;

(c) a coordinate switch including as many switching circuits as there are conductors in any of the coordinate families, each circuit including separate output terminals for each coordinate connected with conductors of different families and each circuit including an input terminal;

(d) oscillator means including means for delivering uniformly spaced pulses;

(e) position determining means including ring counter means connected to be pulsed by said uniformly spaced pulses and having plural outputs connected for successively delivering pulses to the individual switch input terminals, means operative concurrently with the ring counter means for generating a waveform of magnitude changing with time during operation of the ring counter means, and separate storage means for each coordinate and each including capacitor means coupled by a gate with said waveform generating means, and said gate being connected with the stylus and operative to couple the capacitor means with said waveform generating means to store a voltage proportional to the wave magnitude at the instant when a pulse from an adjacent conductor is picked up by said stylus tip; and (f) system programming means including means for operating the switching means and the storage gates to select the conductors of another coordinate each time coarse and fine position determinations have been completed on one coordinate.

16. A system for locating the position of a substantially free stylus with respect to plural families of spaced conductors each including N conductors representing dimensional coordinates comprising:

(a) a matrix panel supporting the conductors in fixed non-intersecting relationship;

(b) a capacitive pickup tip on said stylus;

(c) a coordinate switch including as many switching circuits as there are conductors in any of the coordinate families, each circuit including separate output terminals for each coordinate connected with conductors of different families and each circuit including an input terminal;

(d) sine wave oscillator means including phase shifters for delivering sine wave components having N different phases and connected to different switch input terminals, and including pulse shaper means for delivering a pulse each time the sine wave from the oscillator passes through its zero axis in one predetermined direction;

(e) amplifier, squarer and differentiator means coupled with the stylus tip and delivering an output pulse each time the composite of the quadrature components picked up by the tip passes through its zero axis in the same predetermined direction;

(f) position determining means including generating means for generating a waveform varying in magnitude with time, said means being controlled by timed gate means coupled to the pulse shaper and periodically set in operation by outputs therefrom for generating and enabling said means during one complete sine wave cycle, and storage means for each coordinate and each including capacitor means coupled with said generating means by a storage gate controlled by said differentiator means for storing in the capacitor means a voltage proportional to the waveform magnitude at the instant when the differentiator means delivers a pulse as a result of the composite components crossing the zero axis; and (g) system programming means controlled by the timed gate means and including means for operating the switching means and the storage gate means to select the conductors of another coordinate each time a position determination has been completed on one coordinate.

17. A system for locating the position of a substantially free stylus with respect to plural families of spaced conductors representing dimensional coordinates, comprising:

(a) a transparent matrix panel supporting the conductors in fixed non-intersecting relationship and including an insulating surface for isolating the stylus from contact with the conductors;

(b) a capacitive pickup tip on said stylus including a writing instrument;

(c) a coordinate switch including as many switching circuits as there are conductors in any of the coordinate families, each circuit including separate output terminals for each coordinate and connected with conductors of different families, and each circuit including an input terminal;

(d) 25 kc. sine wave oscillator means including phase shifters for delivering sine wave quadrature components, diode coupling means connecting said components simultaneously in repeating sequence to the switch input terminals, and including pulse shaper means for delivering a pulse each time the sine wave from the oscillator passes through its zero axis in one predetermined direction, and including harmonic multiplier means for delivering a fourth and a sixteenth harmonic of the sine wave;

(e) amplifier, squarer and differentiator means coupled with the stylus tip and delivering an output pulse each time the composite of the quadrature components picked up by the tip passes through its zero axis in the same predetermined direction;

(f) fine position determining means including sawtooth generating means controlled by a 50 $\mu$sec. delay gate coupled to the pulse shaper and set in operation by an output pulse therefrom for generating a sawtooth voltage wave for 50 μsec. after receipt of a pulse from the shaper, means for applying peaks of the fourth harmonic from the multiplier means to the sawtooth waveform to compensate for the nearness of the stylus to a conductor when passing directly over it, a fine storage means for each coordinate and each including capacitor means coupled with said sawtooth generating means by an input gate controlled by said differentiator means for storing in the capacitor means a voltage proportional to the wave magnitude at the instant when the differentiator means delivers a pulse as a result of the composite components crossing the zero axis; variable delay means for blocking the input gate for a variable period to prevent jitter when the zero-axis crossing of the quadrature components is very near the beginning or the end of the sawtooth wave and including means coupled between the variable delay and the fine storage means for shifting the amount of delay back and forth depending upon the magnitude of the level of the fine storage means, and gate means for blocking the input gate for at least 40 μsec. after a pulse is received from the differentiator means;

(g) coarse position determining means including a delay circuit set in operation by said 50 μsec. gate at the end of its operation, ring counter means set in operation by said delay circuit and connected to be pulsed by said harmonic multiplier means to deliver at plural outputs a sequence of pulses connected to the individual switch inputs, staircase waveform generating means including input binary means having a first input connected to be triggered by the harmonic multiplier means for generating stepped voltage levels changing after each fourth conductor is pulsed by the counter means and having a second input for initially advancing the count by two pulses to cause the first step to energize only two conductors before the step changes; and separate coarse storage means for each coordinate and each including capacitor means coupled with said staircase generating means by an input gate controlled by said amplifier and differentiator means for storing a voltage proportional to the wave magnitude at the instant when a pulse from an adjacent conductor is picked up by said stylus tip;

(h) separate analog amplifier means for each coordinate and coupled to the fine and coarse storage means for that coordinate and delivering an output signal proportional to the instantaneous combined fine and coarse storage voltage levels;

(i) extra step gate means controlled by the 50 μsec. delay means and operative during substantially the first half of its delay to couple a signal initiated by the stylus if the quadrature components cross the zero axis during said first half to said second input of the staircase generator to advance its count; and (j) system programming means including means operated by the last count of the ring counter for operating the switching means and the storage input gate means to select another coordinate each time coarse and fine position determinations have been completed on one coordinate.

18. In a system as set forth in claim 17, said system programming means including gate means operated by the trailing edge of the 50 μsec. delay gate means for initiating the operation of the ring counter means and of the staircase generator means, gate means, operated by the last count of the ring counter for operating said switch and for enabling operation of the 50 μsec. delay gate means to apply the phase-shifted components to the conductors of the matrix panel and initiate the sawtooth generating means.

No references cited.

NEIL C. READ, *Primary Examiner.*

THOMAS A. ROBINSON, *Examiner.*